3,248,387
AMINO-ACYLAMINO-PENICILLANIC ACIDS

Harvey E. Alburn, West Chester, Norman H. Grant, Wynnewood, and Horace Fletcher 3rd, Pottstown, Pa., assignors to American Home Products Corporation, New York, N.Y., a corporation of Delaware
No Drawing. Filed Feb. 7, 1963, Ser. No. 256,812
2 Claims. (Cl. 260—239.1)

This invention relates to new synthetic penicillins having potent activity against gram-negative and gram-positive micro-organisms.

In our co-pending patent application Serial No. 175,828, filed February 26, 1962, now abandoned, and of which the present application is a continuation-in-part, there is disclosed a novel method for preparing varoius penicillanic acid derivatives, including those having the general structural formula:

(I)

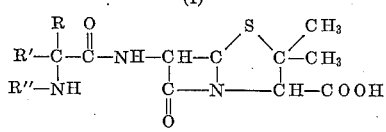

wherein R, R' and R" each may represent a member selected from the group consisting of hydrogen, aryl, aralkyl, saturated alkyl, unsaturated alkyl, cycloalkyl, and heterocyclic radicals; R and R' may be joined to form a hydrocarbon ring; and R' and R" may be joined to form a heterocyclic ring. As disclosed in our said copending patent application Serial No. 175,828, R, R' and R", when separate radicals or forming a ring as defined, may carry substituents such as those disclosed for aryl in said patent application and in U.S.P. 2,985,648 referred to in said application.

The process, described and claimed in said co-pending application, generally comprises the reaction of a 4-substituted-2,5-oxazolidinedione (also known as an N-carboxy amino acid anhydride) with 6-aminopenicillanic acid under controlled conditions. The N-carboxy amino acid anhydride reactant may be represented schematically as follows:

(II)

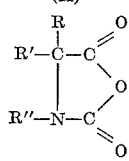

wherein R, R' and R" each may have the same meaning as stated for general structural Formula I.

The classic methods for preparing the 4-substituted-2,5-oxazolidinediones include (a) the carboalkoxy procedure, (b) the azide rearrangement procedure, and (c) the phosgenation procedure. These methods, of which phosgenation is preferred, have the desirable feature that they do not change the steric configuration when an asymmetric carbon is present. The forming of the 4-substituted-2,5-oxazolidinedione with the use of method (c) may be represented schematically as follows:

(III)

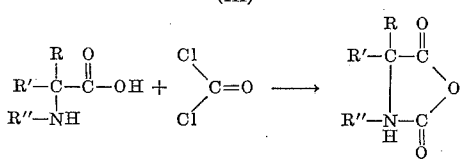

wherein R, R' and R" each may have the same meaning as stated for general structural Formulae I and II. Preferably, in said phosgenation procedure, the amino acid reactant is dissolved or suspended in dioxane, phosgene is introduced into the reaction mixture, and the resulting anhydride is crystallized by the addition of an agent such as benzene.

Numerous methods for preparation of the 6-aminopenicillanic acid are now available in the art, including the methods referred to in said U.S.P. 2,985,648, and also in U.S.P. 3,032,473, and hence need not be described here.

In the preferred exercise of the method of the present invention, the 4-substituted-2,5-oxazolidinedione chosen is reacted with 6-aminopenicillanic acid in approximately equimolar quantities in a cold aqueous solution in a pH range from about 3.6 to about 6.2 and preferably in the range 4.0–5.7. The mixture is stirred for several hours at a temperature from just above the freezing point of the aqueous mixture to about 37° C., and preferably in the range 0–10° C. Although not essential, it may be preferred to include a buffer having an ionic strength of above 0.02, preferably about 0.3, to aid in keeping the reaction mixture within the required pH range. Suitable buffers for maintaining the desired pH may be any mixture of organic or inorganic water-soluble acids, bases, or salts such as sodium acetate-acetic acid, calcium acetate-acetic acid, pyridine-acetic acid, formic acid-ammonia, etc. Alternatively, the reaction mixture may be maintained within the requisite pH range by careful addition of a base such as NaOH or the like.

With the use of the described method, there has now been discovered a series of new penicillanic acid derivatives having the general structural formula:

(IV)

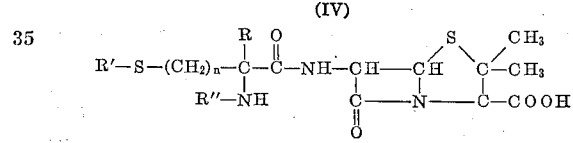

wherein R' may be lower alkyl, n may be a whole number from 1 to 5, and R and R" may have the same meaning as in Formulae I, II and III.

The new compounds of the series defined above show desirable broad spectrum antibacterial activity and are useful as therapeutical agents in poultry and mammals, including man, in the treatment of infectious diseases caused by gram-positive and gram-negative bacteria, upon their parenteral or oral administration. They also have use as nutritional supplements in animal feed.

The following examples are illustrative of the invention, but are not to be considered necessarily limitative thereof:

EXAMPLE I

6-[D - α - amino-γ-(methylthio)butyramido]-penicillanic acid

Admix 1.5 g. of D-methionine-N-carboxyanhydride with 1.2 g. of 6-aminopenicillanic acid in 135 ml. of water. Stir the resulting mixture for 3 hours at pH 4.5 in an ice-water bath. Freeze-dry the resulting solution to give 1.9 g. of 6-[D-α-amino-γ-(methylthio)butyramido]-penicillanic acid product possessing antimicrobial activity against *Staph. aureus* and *E. coli*.

EXAMPLE II

Add 50 mg. of D-methionine-N-carboxyanhydride to each of 10 flasks containing 40 mg. of 6-aminopenicillanic acid and 4.5 ml. of buffers of varying pH. Stir in an ice-water mixture for 3.5 hours. Assay activity against *E. coli*, using D-α-amino-benzyl-penicillin as the standard to show the following.

| Reaction mixture pH: | Mg. antibiotic/ml. |
|---|---|
| 3.90 | 3.60 |
| 4.22 | 5.76 |
| 4.51 | 5.50 |
| 4.90 | 2.50 |
| 5.00 | 2.66 |
| 5.15 | 2.60 |
| 6.00 | 2.04 |
| 6.15 | 1.70 |
| 6.76 | 1.36 |
| 6.80 | 1.14 |

EXAMPLE III

*6 - [D-α-amino-β-(ethylthio)propionamido]-penicillanic acid*

Follow the procedure described in Example I, substituting the N-carboxyanhydride of D-2-amino-3-(ethylthio)-propionic acid for D-methionine-N-carboxyanhydride, to prepare 6-[D - α - amino-β-(ethylthio)propionamido]-penicillanic acid.

EXAMPLE IV

*6-[DL-2-amino-3-(methylthio)propionamido]-penicillanic acid*

Stir a mixture of 1 g. of the N-carboxyanhydride of DL-2-amino-3-(methylthio)-propionic acid and 0.8 g. of 6-aminopenicillanic acid in 100 ml. of ice-cold water for 2 hours while maintaining the pH at 4.5. Freeze-dry the filtered reaction mixture. Analyze the product by paper chromatography and show, by bioautography, that it is active against *Staph. aureus* and *E. coli*.

EXAMPLE V

*6 - [DL - 2 - amino - 7 - (methylthio)heptanamido]-penicillanic acid*

Add 1 gram of the N-carboxyanhydride of DL-2-amino-7-(methylthio)-heptanoic acid over a 30 minute period with stirring to a solution of 0.8 g. of 6-aminopenicillanic acid in 100 ml. of ice-cold water. Stir the mixture for an additional 90 minutes while maintaining the pH at 4.5. Filter the resulting mixture and freeze-dry the filtrate to result in a product showing activity against *Staph. aureus* and *E. coli* in agar plate assays.

EXAMPLE VI

*6 - [D - 2 - amino - 4 - (ethylthio)butyramido]-penicillanic acid*

Carry out the synthesis of 6-[D-2-amino-4-(ethylthio)butyramido]-penicillanic acid by stirring a mixture of 1 g. of D-ethionine-N-carboxyanhydride and 0.8 g. of 6-aminopenicillanic acid in 100 ml. of ice-cold water for 2 hours while maintaining the pH at 4.5. Freeze-dry the filtered reaction product to result in a product showing antibiotic activity against both gram-positive and gram-negative organisms.

As will be understood by those skilled in the art, the compounds of the invention may be utilized in their acid form or in the form of the therapeutically-active salts thereof, e.g., the sodium or potassium salts, or the hydrochloride, etc., or in the form of the pharmaceutically-acceptable acid-addition salts prepared by the reaction of the penicillin compounds with an amine base, e.g., procaine, N,N'-dibenzylethylene-diamine, etc.

We claim:
1. A compound of the formula:

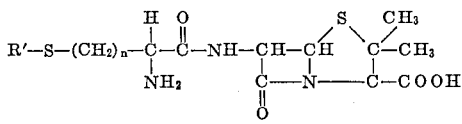

wherein R' is of the group consisting of methyl and ethyl, and $n$ is a whole number from 1 to 5.

2. 6 - [D - α - amino - γ - (methylthio)butyramido] penicillanic acid.

References Cited by the Examiner

UNITED STATES PATENTS

| 2,985,648 | 5/1961 | Doyle et al. | 260—239.1 |
| 3,079,306 | 2/1963 | Offe et al. | 260—239.1 |
| 3,080,356 | 3/1963 | Catlin et al. | 260—239.1 |

FOREIGN PATENTS

| 628,231 | 2/1962 | Belgium. |
| 903,785 | 8/1962 | Great Britain. |

NICHOLAS S. RIZZO, *Primary Examiner.*

IRVING MARCUS, *Examiner.*

JAMES W. ADAMS, *Assistant Examiner.*